Sept. 11, 1956   G. MEYER   2,762,230
REVERSIBLE TRANSMISSION
Filed March 19, 1953
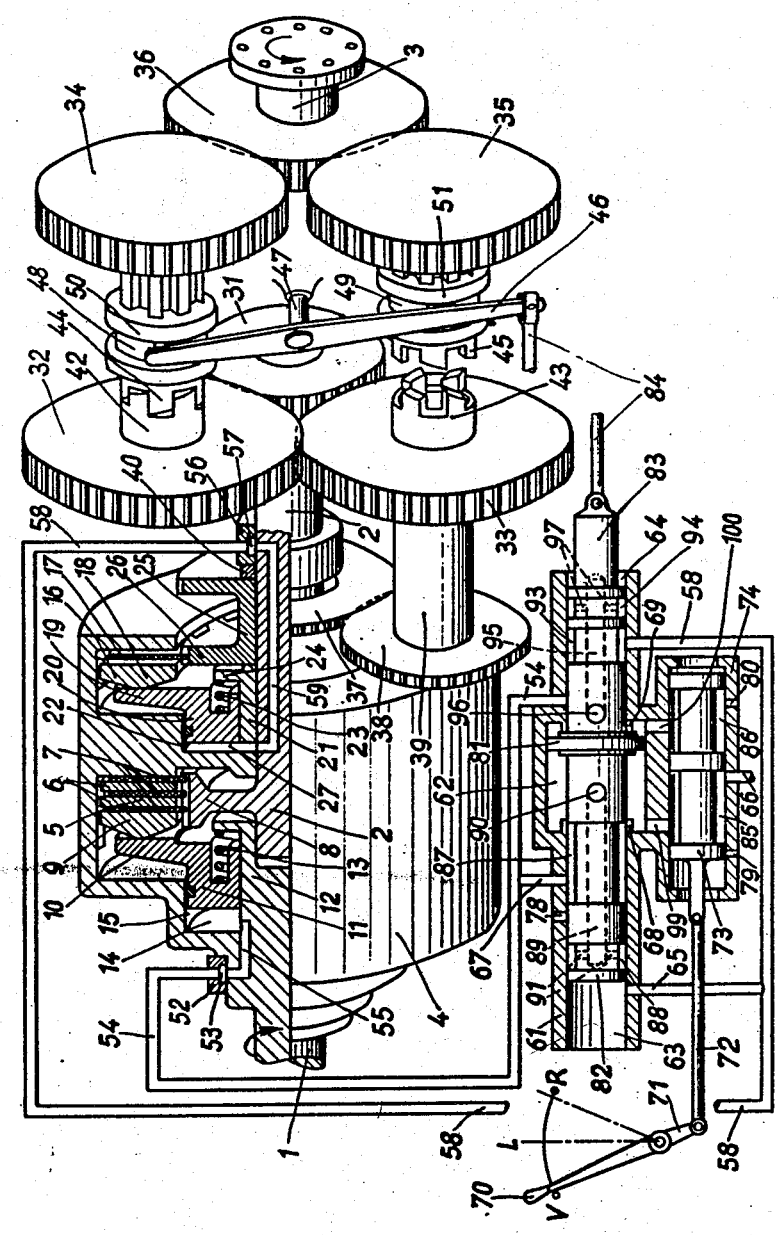
INVENTOR.
GUSTAV MEYER.
BY
K.B. Mays
ATTORNEY.

United States Patent Office 2,762,230
Patented Sept. 11, 1956

2,762,230

REVERSIBLE TRANSMISSION

Gustav Meyer, Friedrichshafen am Boden See, Germany, assignor to Maybach-Motorenbau G. m. b. H., Friedrichshafen, Germany, a firm of Germany Application March 19, 1953, Serial No. 343,379

Claims priority, application Germany March 24, 1952

5 Claims. (Cl. 74—339)

The present invention relates to a reversible transmission which is more particularly adapted for driving power boats, particularly highly powered boats, and for driving ships. The transmission comprises a main clutch, which is preferably of the friction type, and a claw clutch for each driving direction. The new transmission does not require differential gears and clutches and brakes therefor, as are conventional in transmissions for ship propulsion. The transmission according to the invention requires only simple spur gears.

The essential feature of the device according to the invention is a synchronizing means which synchronizes the speed of the parts of the claw clutch which must be engaged, after disengagement of the previously engaged claw clutch. The new transmission comprises a set of spur gear wheels which are driven by the synchronizing means for reversing the direction of rotation of the claw clutch part which must be engaged. The two claw clutches are simultaneously actuated for engaging one clutch and disengaging the other clutch, the actuating means therefor having no definite middle position. There is an auxiliary drive for the driving parts of the two claw clutches, which drive can be connected with the main drive shaft by means of an auxiliary clutch for accelerating the driving part of the clutch to be engaged so that it can overtake and can be engaged with the driven part of the clutch after its direction of rotation has been reversed. The claws of the claw clutches have inclined front faces preventing engagement of the clutches before the rotational speed of the clutch parts is synchronized.

The transmission according to the invention is extremely simple and requires little space. It is less expensive and operates more quietly than differential transmissions and can be used at higher speeds and for transmitting greater loads, for example 1000 to 2000 H. P. at 1000 to 2000 R. P. M., than differential transmissions. Reversing is effected quickly and without shock.

The synchronizing device preferably comprises a reversing tooth gear transmission which is arranged between one of the claw clutches and an auxiliary clutch which may form a unit with the main clutch, the auxiliary clutch being interposed between the prime mover and the tooth gear transmission. The latter forces the driving part of the claw clutches to rotate in the same direction as the driven part of the clutch is driven by the main driven shaft.

The driving part of one claw clutch is preferably arranged at the end of an auxiliary shaft which carries a pair of spur gearing wheels. One of said wheels forms part of the reversing gear transmission mentioned in the paragraph next above and the other wheel meshes with a gear wheel to which the driving part of the other overtake claw clutches is coaxially connected. The last mentioned wheel is in mesh with a wheel on an intermediate shaft which can be connected with the main drive shaft by means of a main clutch. The driven part of the aforementioned other claw clutch extends from a spur gear wheel which is in mesh with a spur gear wheel on the main driven shaft of the whole transmission. The last mentioned spur gear wheel is in mesh with a spur gear wheel coaxially connected with the driven part of the first claw clutch. Other arrangements of the wheels of the transmission and of the auxiliary drive for the synchronizing means may be made without departing from the scope of the invention as long as they produce the same effect.

An object of the invention is the provision of a hydraulic actuating device for operating the clutches of the new transmission, i. e. for engaging and disengaging the main clutch, the two claw clutches, and the auxiliary clutch forming part of the synchronizing device. The hydraulic actuating means may be directly or indirectly controlled by a hand lever. For exact and quick actuation of the synchronizing device, control of the latter is made dependent on the stroke of the axially movable parts of the claw clutches. The synchronizing device is activated as shown as the parts of the claw clutch to be engaged are in adjacent position and is inactivated to the same extent as the claws of one part of the clutch to be engaged move into the gaps between the claws of its mating part. The pressure of the operating liquid of the hydraulic device acting on the clutch of the synchronizing device is preferably made proportionate to the extent of the movement of the mating parts of the claw clutches towards and from each other.

The novel features which I consider characteristic of my invention are set forth with particularlity in the appended claims. The invention itself however and additional objects and advantages thereof will best be understood from the following description of an embodiment thereof when read in connection with the accompanying drawing in which a removable transmission suitable for ship propulsion is schematically illustrated. The clutches and gear wheels are shown in perspective and the former are shown partly in section, bearings for the shafts and the teeth of the gear wheels having been omitted; the control valves for the hydraulic actuating device are shown in longitudinal section.

Referring more particularly to the drawing, numeral 1 designates a main shaft driven by a prime mover, not shown, numeral 2 designates an intermediate shaft, and numeral 3 the shaft driven by the transmission. A housing 4 is rigidly connected with the shaft 1 and contains a main clutch 5 comprising discs 6 guided in housing 4 for axial movement but not rotatable relatively to the housing and discs 7 which are axially movably supported by a hub portion 8 of the shaft 2 but are not rotatable relatively to the shaft 2. A presser plate 9, which is axially movably guided in casing 4 but not rotatable relatively thereto, is interposed between the clutch discs and a flange 10 of a piston 11. The latter is axially movable on a portion 12 of shaft 1 and urged away from plate 9 by a spring 13. Piston 11 extends into a chamber 14 formed in a cylindrical portion 15 of casing 4.

Casing 4 contains a second, less powerful, auxiliary friction clutch 16 comprising a friction disc 17 and a presser plate 18, the latter being axially movably guided in casing 4 but not rotatable relatively to the casing. Plate 18 bears against a flange 19 of a piston 20 which is axially movable on a sleeve 21 which is fast on shaft 2. Piston 20 is axially movable in a chamber 27 of a cylindrical portion 22 of casing 4 and is urged into the chamber 27 by means of a spring 23 which rests against a collar 24 of the sleeve 21. Numeral 25 designates an annular member forming an auxiliary shaft means which is rotatable on shaft 2 but not axially movable. Its proper position in casing 4 is maintained by a spacer ring 40. Member 25 has at its left end a flange 26 which is splined at its circumference for axially movably supporting the friction disc 17.

A spur gear wheel 31 is connected with the right end of the intermediary shaft 2. The teeth of wheel 31 mesh with the teeth of a spur gear wheel 32, the latter engaging a spur gear wheel 33, forming a main reversing gearing. The driven shaft 3 carries a spur gear wheel 36 which is in mesh with spur gear wheels 34 and 35. The right end of the auxiliary shaft means 25 is provided with a spur gear wheel 37 which is in mesh with a spur gear wheel 38 which is fast on the left end of an auxiliary shaft 39, the right end of the latter carrying wheel 33. Wheels 37, 38 form an auxiliary reversing gearing.

Wheel 32 is provided with a claw clutch part 42 mating with an axially movable claw clutch part 44. Wheel 33 is provided with a claw clutch part 43 mating with an axially movable claw clutch part 45. Parts 44 and 45 are arranged on splined shafts which are rigidly connected with wheels 34 and 35, respectively. Numeral 46 designates a two-arm actuating lever swingable on pin 47 and having pins at its ends, individually engaging annular grooves 48 and 49 of sleeves 50 and 51 forming part of the clutch parts 44 and 45, respectively.

A slip ring 52 having an internal groove 53 rides on shaft 1, the latter having a channel 55 communicating with groove 53. Shaft 2 carries a similar slip ring 56 having an internal groove 57 communicating with channel 59 in shaft 2.

Numeral 61 designates a slide valve casing having a central cylindrical chamber 62 and cylindrical chambers 63 and 64 extending from the ends of chamber 62. A conduit 58 connects the groove in slip ring 56 with chamber 64. Chamber 63 is connected with conduit 58 by means of a conduit 65.

A slide valve 73 having annular recesses 85 and 86 is axially movable in a cylinder 74 arranged below chamber 62. Valve 73 is actuated by means of a hand lever 70, the lower arm 71 of which is connected with the valve by a connecting rod 72. The interior of cylinder 74 is connected with the outside by means of ports 79 and 80. Oil under pressure is supplied to cylinder 74 through conduit 66.

Numeral 81 designates a piston axially movable in chamber 62. A piston part 82 extends to the left from piston 81 and a part 83 extends to the right from piston 81. Part 83 is connected with the lever 46 by means of a rod 84. Piston part 82 has annular recesses 87 and 88 and an axial bore 89, the latter communicating with chamber 62 by means of a transverse bore 90 and with recess 88 by means of a transverse bore 91. Piston part 83 has two annular recesses 93 and 94 and an axial bore 95 adapted to communicate with chamber 62 by a transverse bore 96 and communicating with recess 94 by a transverse bore 97. Chamber 62 is connected with the interior of cylinder 74 by means of conduits 99 and 100.

The drawing illustrates the transmission in the position for forward drive. Slide valve 73 is in its right end position forming a passage for the oil supplied through conduit 66 through the recess 85 and channel 99 into chamber 62 on the left side of piston 81 which is pressed by the oil into its right end position, engaging the claw clutch 42, 44 and disengaging the claw clutch 43, 45 through the linkage 84, 46. The synchronizing clutch 16 is disengaged because the groove 57 of slip ring 56 is connected through conduits 58 and 65 with the outside and there is no pressure in channel 59 and in the chamber 27 in front of the piston 20.

If the gearing is to be reversed, lever 70 is moved from the position V to the position R and slide valve 73 is moved to its left end position in which the port 80 is at the right side of the right end of the slide valve 73 so that the part of chamber 62 at the right side of piston 81 is no more connected with the outside but communicates through channel 100 and the recess 86 with the oil supply conduit 66 and the piston 81 is pushed to the left. Lever 46 is thereby turned clockwise and claw clutch 44, 42 is disengaged. When piston 81 is somewhat to the left of its middle position, the end faces of the claws of clutch part 45 are adjacent to the end faces of the claws of clutch part 43 which rotates in opposite direction of part 45.

Oil can now flow through bores 96, 95, and 97 into the recess 94 of the piston part 83 and therefrom through conduit 58 into the groove 57 of the slip ring 56 and through the channel 59 into the space 27. This causes movement of piston 20 to the right and engagement of the auxiliary clutch 16. Shaft 1 is now connected with clutch part 43 through casing 4, clutch 16, gear wheel 37, gear wheel 38, shaft 39, and gear wheel 33, reversing rotation of claw clutch part 43 to rotate in the same direction as clutch part 45. Part 43 is rotated somewhat faster than part 45 so that the gaps between the claws of the former are positioned oppositely to the claws of the latter and the clutch is engaged by the oil pressure urging piston 81 to the left. The latter can now move into its left end position allowing flow of oil from the right side of piston 81 into the annular recess 93 of piston part 83 through a recess 69 in a collar of casing 61 extending into chamber 62. From recess 93 the oil flows through conduit 54 into the groove 53 of slip ring 52 and through channel 54 of shaft 1 into the space 14. This causes movement of piston 11 to the right and engagement of the main clutch.

At the same time communication of space 27 through channel 59, groove 57 of the slip ring 56, conduit 58 and bores 97, 95, 96 with the oil supply is interrupted because the end of piston member 83 is now at the left side of the mouth of conduit 58 in casing 61. There is therefore no pressure in chamber 27 and spring 23 moves the piston 20 to the left disengaging the auxiliary clutch 16 as soon as clutch 43, 45 is engaged. Drive of clutch part 43 through the casing 4 and the gear wheels 37, 38 is interrupted and part 43 is now driven through the main clutch 5, shaft 2, and the spur gear wheels 31, 32, and 33. Shaft 3 is now driven in reversed direction through the claw clutch 43, 45 and the spur gear wheels 35, 36.

The axial end faces of the claws of clutch parts 42, 44 and 43, 45 are inclined preventing engagement of the clutches as long as their mating parts rotate at different speeds.

Changing from reverse operation to forward drive is effected analogously, disengagement of clutch 5 being caused by connecting conduit 54 through conduit 67, the recess 87 and the port 78 with the outside. The auxiliary clutch 16 is engaged by conducting oil through conduit 58 into the chamber 27. Conduit 58 receives oil from conduit 65 through channels 91, 89 and 90 from chamber 62, the latter receiving oil from conduit 66 through recess 85 and channel 99. Wheel 32 is thereby rotated in a direction opposite to its previous rotation and so accelerated that clutch 42, 44 is engaged whereupon clutch 16 is disengaged, as described, and the main clutch 5 is engaged so that shaft 3 is now driven in forward direction.

The transmission may be neutralized by moving lever 70 into position L whereby the slide valve 73 is in its middle position in which the mouth of the oil supply conduit 66 is closed and the left as well as the right side of piston 81 is connected with the outside through the channels 99 and 100, the recesses 85 and 86, and the ports 79 and 80. The recess 87 of piston part 82 is connected through an axial slot 68 in a collar of casing 61 extending into the chamber 62 with the latter which is connected with the outside through channel 99, recess 85 and port 79. This renders conduits 67 and 54, as well as groove 53 and chamber 14 without pressure so that spring 13 can disengage the clutch 5. The prime mover can now run without load and the transmission remains in the forward or reverse condition in which it was when lever 70 was moved to neutral position and until it is again moved into one of its extreme end positions.

While I have shown and described a specific embodiment of my invention, it will be apparent to those skilled in the art that various changes, modifications, substitutions, additions and omissions may be made therein without departing from the spirit and scope of my invention as set forth in the appended claims.

What is claimed is:

1. A reversible transmission comprising a drive shaft, an intermediate shaft, a main clutch interposed between said drive shaft and said intermediate shaft, auxiliary shaft means, an auxiliary clutch interposed between said drive shaft and said auxiliary shaft means, a driven shaft, a first clutch operably interposed between said intermediate shaft and said driven shaft, an auxiliary shaft, an auxiliary reversing gearing interposed between said auxiliary shaft means and said auxiliary shaft, a main reversing gear interposed between said intermediate shaft and said auxiliary shaft, a second clutch operably interposed between said auxiliary shaft and said driven shaft, first actuating means connected with said first and said second clutches for alternately engaging one and disengaging the other of said first and second clutches, and second actuating means connected with said first actuating means and with said main clutch and with said auxiliary clutch for alternately engaging one and disengaging the other of said main and auxiliary clutches upon predetermined positions of said first actuating means.

2. A reversible transmission as defined in claim 1, each of said first and said second clutches having two mating parts, each mating part having claws, said claws having inclined axial faces preventing engagement of said first and said second clutches as long as their mating parts rotate at different speeds.

3. A reversible transmission as defined in claim 1, comprising a set of spur gear wheels interposed between said first clutch and said driven shaft, and said auxiliary reversing gearing and said main reversing gearing comprising each a set of spur gear wheels.

4. A reversible transmission as defined in claim 1, said main clutch and said auxiliary clutch comprising each a hydraulically operated piston for individually actuating said main clutch and said auxiliary clutch, said second actuating means comprising a slide valve affording flow of a liquid under pressure to either one or the other of said pistons.

5. A reversible transmission comprising a main shaft, an intermediary shaft, a main clutch interposed between said main shaft and said intermediary shaft, a driven shaft, a first claw clutch operably interposed between said intermediary shaft and said driven shaft, an auxiliary shaft, a reversing gearing interposed between said auxiliary shaft and said intermediary shaft, a second claw clutch operably interposed between said auxiliary shaft and said driven shaft, synchronizing means interposed between said auxiliary shaft and said main shaft, first actuating means connected with said claw clutches for alternately engaging one and disengaging the other claw clutch, and second actuating means connected with said first actuating means and with said main clutch and with said synchronizing means for alternately actuating either said main clutch or said synchronizing means.

References Cited in the file of this patent

UNITED STATES PATENTS

| | | |
|---|---|---|
| 2,241,861 | Lang | May 13, 1941 |
| 2,323,070 | Meyer | June 29, 1943 |
| 2,396,456 | Campodonico | Mar. 12, 1946 |